Patented July 24, 1934

1,967,916

UNITED STATES PATENT OFFICE 1,967,916

PROCESS FOR THE PURIFICATION OF ORGANICALLY POLLUTED WATERS

Oliver M. Urbain, Columbus, Ohio, assignor to Charles H. Lewis, Harpster, Ohio

No Drawing. Application August 28, 1933, Serial No. 687,244

5 Claims. (Cl. 210—2)

This invention relates to a process for purification of organically polluted waters.

It is the broad object of the invention to provide an improved process applicable to both biological and chemical precipitation processes for treating polluted liquids such as municipal sewage and industrial waste.

In a more specific aspect it is an object of the invention to provide an improved process for oxidizing putrescible organic matter present in the liquid, more particularly to oxidizing organic matter that is present in the liquid in true solution.

At the present time there are in general use two principal methods for purification of organically polluted waters. These are the biological processes so called because the purification is effected through the agency of micro-organisms, either bacteria or protozoa. The activated sludge process is exemplary of this group. In the activated sludge process sewage is first passed through sedimentation basins after which it is retained for from four to six hours in aeration tanks. During this long period of detention the diffused air is constantly passed through the sewage to effect oxidation of the organic matter to a non-putrescible form through the agency of protozoa. This type of aeration is objectionable because of the long detention period necessary and further because it is ineffective when the sewage contains poisons which destroy the life cycle of the protozoa. The present invention is designed and intended to obviate these objections.

In chemical precipitation processes it is the purpose of the present invention to more economically provide for the removal of the true solution fraction of the putrescible organic matter.

The present invention provides a process capable of application to the activated sludge process or to chemical precipitation processes with very little change in the present equipment and cycle of operating conditions.

The application of the invention of the present application to the activated sludge process eliminates the difficulties incident to bacterial poisons generally present in all sewage and cuts down the aeration period of from four to six hours to a period of less than one hour. This results in large saving and greater efficiency of operation. When the present invention is applied to chemical precipitation processes, it eliminates the necessity for using special reagents and equipment for removing the fraction of putrescible organic matter present in the sewage in true solution. It is especially valuable also in chemical precipitation processes for treating industrial waste such as packing house, creamery, cheese, cannery, strawboard and tannery. The invention in its most specific aspect relates to the employment of a special catalyst to induce oxidation of the putrescible organic compounds by atmospheric oxygen.

Ordinarily organic compounds have no affinity for atmospheric oxygen, but it has been ascertained that when a proper catalyst is used oxidation can be rapidly induced. This is particularly true of unsaturated organic compounds. The unsaturated organic compounds present in polluted liquids are responsible to a very large extent for the biochemical oxygen demand of the true solution fraction of the organic matter present in the liquid and it is therefore important to oxidize these unsaturated organic compounds. It has been ascertained that if yellow phosphorus is maintained submerged in the putrescible liquid supported either on perforated trays or molded on wire screen grids or the like, it acts as a promoter catalyst in the oxidation of the organic compounds when diffused air is blown through the liquid.

While yellow phosphorus is a very active chemical substance, it has been found that it does not undergo decomposition but functions as a true catalyst in the oxidation of organic compounds in water. The usual precautions incident to the handling of yellow phosphorus are necessary in the application of this substance as a catalyst to the present process for oxidizing organic matter in water. The yellow phosphorus is kept immersed in the water except at short intervals when it may be necessary to clean the grids or trays for any reason.

It is advantageous to provide grids or trays in sections so that one section may be removed without disturbing the others. It is also advantageous to place the trays or sections in layers in the oxidation tank so that the diffused air passes through successive layers of the catalyst. In this manner maximum efficiency is obtained. The greater the exposed surface of the catalyst, the shorter the time period necessary for effecting oxidation and less amount of air required.

The process may be applied in a conventional fill and draw detention tank operation or a continuous flow treatment may be resorted to. In either event the period of contact required will vary from fifteen minutes to one hour depending upon the particular type of liquid treated and to be oxidized and the quantity of organic compounds present therein. The end products of oxidation are for the most part carbon dioxide and water. The diffused air should of course be supplied somewhat in excess of that necessary for oxidation of the organic compounds present in the liquid.

It will be observed that the process does not depend upon biological agencies and that the oxidation can be effected just as successfully upon any industrial waste as upon domestic sewage and that it can also be effected in the treatment of sewage containing bacterial poisons which would normally destroy the life cycle of the protozoa.

When the process is applied to an activated sludge operation it is substituted for the aeration step now employed in such operations. The only addition necessary being the application of the catalyst unit. By the introduction of the catalyst unit the storage capacity of the aeration tanks in an activated sludge process may be permissibly cut down approximately 80% from the capacity normally employed for carrying out the aeration step in such operations. The process insures a greater reduction of biochemical oxygen demand than now obtained, for example, it has been ascertained that a 15% greater reduction can be obtained by the employment of the process of the instant invention over the employment of the usual and conventional aeration step. A very important advantage in the use of the present invention in biological processes resides in the elimination of the harmful effects of bacterial poisons which at the present time constitute one of the greatest handicaps in the use of bacterial processes.

The yellow phosphorus is insoluble under normal conditions of the sewage and will last indefinitely. Due to some protective action of the water film surrounding the catalyst it does not enter into the oxidizing reactions, but merely functions as a promoter catalyst. In the application of the process to chemical precipitation purification operations the oxidation step is employed just prior to coagulation. In such processes the lime employed permits the reaction of the carbon dioxide resulting from the oxidation with the lime to produce calcium carbonate which will be coagulated along with the other matter. The calcium carbonate additionally serves as a sludge conditioner and improves its character. It will be at once apparent that to the extent that organic matter present in the liquid is removed by oxidation to that extent the amount of sludge is reduced, especially since comparatively large amounts of adsorbents are normally necessarily employed to effect removal of organic matter held in true solution in the liquid.

From the foregoing specification it will be apparent that the present invention comprises a process for rapidly and economically effecting oxidation of putrescible organic matter present in polluted liquids.

What I claim as my invention is:—

1. A process for oxidizing putrescible organic matter in water comprising passing diffused air through the water containing the organic matter to be oxidized and promoting the oxidation by the employment of a catalyzer in the form of yellow phosphorus.

2. An improvement in processes for oxidizing organic matter in water comprising effecting the oxidation in the presence of yellow phosphorus.

3. A process for oxidizing organic matter in water comprising submerging in the water a quantity of yellow phosphorus and passing air through the water for a period of from fifteen minutes to one hour.

4. A process for oxidizing organic matter in water comprising submerging a plurality of layers of a catalyst in the form of yellow phosphorus in the water and passing air through the water in such manner that it will pass through said layers of yellow phosphorus.

5. A process for oxidizing organic matter in water comprising submerging a plurality of layers of a catalyst in the form of yellow phosphorus in the water and passing air through the water in such manner that it will pass through said layers of yellow phosphorus and continuing the passage of air through the water for a period of from fifteen minutes to an hour.

OLIVER M. URBAIN.